United States Patent [19]

Locati

[11] Patent Number: 5,476,033

[45] Date of Patent: Dec. 19, 1995

[54] AUTOMATIC MACHINE FOR COFFEE BEVERAGE, DELIVERABLE AS COFFEE ALONE OR, COMBINED WITH MILK, IN THE FORM OF CAPPUCCINO

[75] Inventor: Santino Locati, Milan, Italy

[73] Assignee: Cimbali S.p.A., Binasco, Italy

[21] Appl. No.: 187,695

[22] Filed: Jan. 26, 1994

[30] Foreign Application Priority Data

Jan. 27, 1993 [IT] Italy .................. MI93U0058

[51] Int. Cl.⁶ .................. A47J 31/00
[52] U.S. Cl. .................. 99/279; 99/287
[58] Field of Search .................. 99/279, 293, 294, 99/295, 290, 300, 302 R, 304, 287; 426/433

[56] References Cited

U.S. PATENT DOCUMENTS

| | | | |
|---|---|---|---|
| 4,287,817 | 9/1981 | Moskowitz | 99/293 |
| 4,309,939 | 1/1982 | Stover | 99/295 |
| 4,852,474 | 8/1989 | Mahlich | 99/293 |

Primary Examiner—Robert W. Jenkins
Attorney, Agent, or Firm—Collard & Roe

[57] ABSTRACT

Automatic machine for a coffee beverage, deliverable as coffee alone or, combined with milk, in the form of cappuccino, has a first station for the delivery of coffee alone which is positioned at a different location from a second station for delivery of cappuccino.

1 Claim, 1 Drawing Sheet

AUTOMATIC MACHINE FOR COFFEE BEVERAGE, DELIVERABLE AS COFFEE ALONE OR, COMBINED WITH MILK, IN THE FORM OF CAPPUCCINO

BACKGROUND OF THE INVENTION

1. Field of the Invention

The present invention relates to an automatic machine for brewing a coffee beverage, which is prepared in an infusion chamber and which is deliverable as coffee alone, or combined with milk, in the form of cappuccino.

2. The Prior Art

In known automatic machines of this kind, if after the delivery of cappuccino, it is desired to deliver only coffee, then it may occur that some drops of milk will fall into the cup into which the coffee is to be delivered.

SUMMARY OF THE INVENTION

It is an object of the present invention to overcome and to prevent this inconvenience.

This and additional objects and advantages of the present invention are achieved primarily by the fact that a first station for the delivery of coffee alone is provided at a different location from a second station for the delivery of cappuccino.

In a preferred embodiment, the delivery of coffee originating from the infusion or brewing chamber takes place through a diverter with two working positions, which in one working position sends the coffee originating from the infusion chamber to the first station for the delivery of coffee alone, and in the second working position sends the coffee to the second station for the delivery of cappuccino.

In a particularly preferred embodiment, the diverter is a pivoted unit, selectively pivoting from time to time between one or the other of its two working positions.

BRIEF DESCRIPTION OF THE DRAWINGS

Other objects and features of the present invention will become apparent from the following detailed description considered in connection with the accompanying drawings which discloses an embodiment of the present invention. It should be understood, however, that the drawings are designed for the purpose of illustration only and not as a definition of the limits of the invention.

In the drawing, wherein similar reference characters denote similar elements throughout the single view, the drawing shows schematically the milk delivery system and a final part of the coffee delivery system.

DETAILED DESCRIPTION OF THE PREFERRED EMBODIMENT

Figure 1:
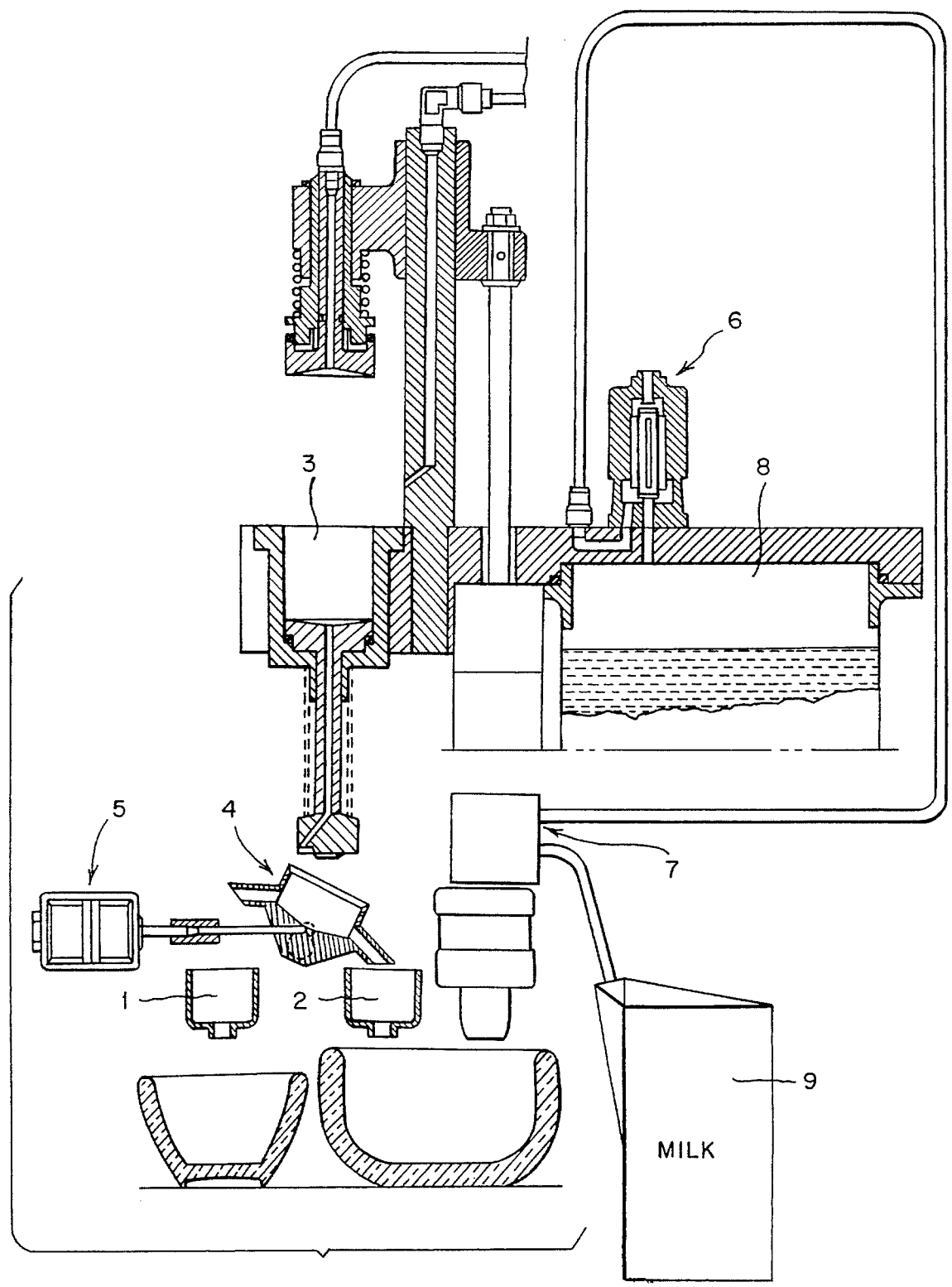

Referring now in detail to the drawing, the cappuccino preparation cycle is automatically put into effect by pressing a special button (not shown). Simultaneously with the start of the coffee preparation cycle, the electrovalve 6 and the actuator 5 of the coffee diverter 4 are activated. The electrovalve 6 permits sending steam under pressure, which steam is contained in a reservoir 8 of the boiler, to the milk riser 7, which by the Venturi effect, sucks up the milk from the storage container 9, heats it and, mixing it with air, generates the typical milk emulsion for preparing cappuccino in the Italian way.

The actuator 5, having maintained the diverter 4 in the first working position, permits the coffee originating from brewing or infusion chamber 3 to be combined in one such cup with the emulsified milk.

By pressing a different button (also not shown) instead of the one for the preparation of cappuccino, the actuator 5 moves and then holds the diverter 4 in its second working position and the coffee only cycle is automatically carried out.

The diverter 4 thus permits forming two different receiving stations for preparing the beverage (receiving station 1 for coffee, receiving station 2 for cappuccino), thereby efficaciously avoiding the dripping of milk when the operator has selected coffee only as the desired beverage.

While only a single embodiment of the present invention has been shown and described, it is to be understood that many changes and modifications may be made thereunto without departing from the spirit and scope of the invention as defined in the appended claims.

What is claimed is:

1. An automatic machine for a coffee beverage, comprising an infusion chamber for brewing coffee;

a first receiving station for the delivery of coffee alone;

a second receiving station at a different location from the first receiving station for the delivery of cappuccino;

a diverter with two working positions through which the delivery of coffee originating from the infusion chamber takes place;

a first working position of said diverter sends the coffee to the first receiving station for the delivery of coffee alone;

a second working position of said diverter sends the coffee to the second receiving station for the delivery of cappuccino; and wherein the diverter is a pivoted unit, having means for selectively pivoting about a horizontal axis from time to time between the first and the second of its two working positions.

\* \* \* \* \*